United States Patent Office 3,539,637
Patented Nov. 10, 1970

3,539,637
N-CARBAMYL AND THIOCARBAMYL-2,3,4,5-TETRAHYDRO - 1,4 - METHANO - 1H - 3-BENZAZEPINES
Frank H. Clarke, Jr., Armonk, and Fred B. Block, Hartsdale, N.Y., assignors to Geigy Chemical Corporation, Ardsley, N.Y., a corporation of New York
No Drawing. Filed Apr. 10, 1967, Ser. No. 629,368
Int. Cl. C07d 41/08
U.S. Cl. 260—247.2                                  9 Claims

ABSTRACT OF THE DISCLOSURE

N-carbamyl and N-thiocarbamyl-2,3,4,5-tetrahydro-1,4-methano-1H-3-benzazepine derivatives are neutral analgesics and are obtained from the corresponding N-unsubstituted benzazepines through the action of carbamyl chlorides, thiocarbamyl chlorides, isocyanates or isothiocyanates or from the corresponding N-cyano-benzazepines through the action of hydrogen peroxide or hydrogen sulfide.

DETAILED DESCRIPTION

The present invention relates to novel organic compounds and to processes for their preparation. In particular the present invention relates to compounds of the formula:

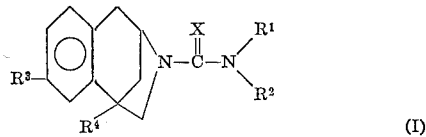

(I)

wherein:

X is oxygen or sulfur;
each of $R^1$ and $R^2$ taken independently is hydrogen or (lower)alkyl and $R^1$ and $R^2$ taken together with the nitrogen to which they are attached are morpholino, piperidino or pyrrolidino;
$R^3$ is hydrogen, hydroxy, (lower)alkoxy, or (lower)-alkanoyloxy; and
$R^4$ is phenyl or (lower)alkyl.

The foregoing N-carbamyl and N-thiocarbamyl-2,3,4,5-tetrahydro-1,4-methano-1H-3-benzazepines demonstrate analgesic properties with little or no addiction liability and are thus useful for the treatment of pain such as is encountered in postoperative, postpartum and traumatic conditions, arthritis, cephalalia, bursitis and the like. They may be administered alone, or in combination with other agents such as aspirin, phenacetin, caffeine and the like, in suitable pharmaceutical formulations such as tablets, capsules, suspensions, suppositories and the like.

In the context of this specification and the claims, the term "alkyl" and derivations thereof containing the root "alk," such as alkylene, alkanoyl and the like, represent a hydrocarbon chain of up to thirty carbon atoms, or a group containing such a chain. When qualified by the designation "lower" such chains will contain from one to six carbon atoms, inclusively. It is to be understood that when the functional groups of derivations of alkyl implicitly require more than one carbon atom, such as the double bond in "alkenyl," there will be at least two carbon atoms present.

The compounds of the present invention are prepared via treatment of a compound of the formula:

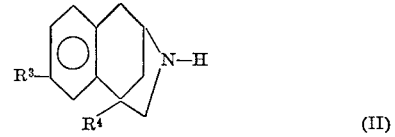

(II)

wherein $R^3$ is as previously described, with a carbamyl chloride or thiocarbamyl chloride in an inert solvent such as benzene or chloroform. The carbamyl chloride or thiocarbamyl chloride may be replaced with an amine, including ammonia, and phosgene or thiophosgene. When $R^3$ is hydroxy, a brief alkaline hydrolysis following the principal reaction may be performed to yield a homogenous product, particularly when excess reagent is employed.

Alternatively, the compounds of Formula II are treated with an isocyanate or isothiocyanate, or with a salt thereof, to yield the compounds of Formula I wherein at least one of $R^1$ and $R^2$ is hydrogen.

Those compounds of Formula I wherein X is oxygen may be converted to those wherein X is sulfur via the action of phosphorus pentasulfide. Those compounds of Formula I wherein X is sulfur may be converted to those wherein X is oxygen via the action of mercuric oxide.

Alternatively the compounds of the present invention wherein both $R^1$ and $R^2$ are hydrogen are obtained via the action of hydrogen peroxide in the presence of base or aqueous acid or the action of hydrogen sulfide on the corresponding N-cyano derivative to yield the N-carbamyl or N-thiocarbamyl compounds respectively. The requisite N-cyano derivatives are obtained from the corresponding known N-methyl compounds through the action of cyanogen bromide. Reduction of the N-cyano intermediates as with lithium aluminum hydride yields the compounds of Formula II wherein $R^3$ is hydrogen, hydroxy or (lower)alkoxy.

The compounds thus obtained bearing a free hydroxy group in the 8-position may be acylated as with an acid anhydride such as propionic anhydride or acetic anhydride or may be etherified as with diazomethane, dimethyl sulfate or the like.

Preparation of the requisite starting materials of Formula II are described in Netherland O.A. No. 6,507,339.

The following examples will serve to further typify the nature of the present invention.

EXAMPLE 1

To a solution of 3.91 mmole of 1-phenyl-2,3,4,5-tetrahydro-1,4-methano-1H-3-benzazepine in 40 ml. of dimethylformamide and 0.75 g. of sodium bicarbonate under anhydrous conditions is added dropwise a solution of 0.42 g. (3.91 mmole) of dimethylcarbamyl chloride in 20 ml. dimethylformamide. The mixture is refluxed for 16 hours, filtered and concentrated in vacuo. The residue is recrystallized several times from benzene:cyclohexane:ethyl acetate to yield N-dimethylcarbamyl-1-phenyl-2,3,4,5-tetrahydro-1,4-methano-1H-3-benzazepine.

EXAMPLE 2

To a solution of 7.16 mmole of 1-ethyl-8-methoxy-2,3,4,5-tetrahydro-1,4-methano-1H-3-benzazepine in 50 ml. chloroform is added 0.76 g. of sodium bicarbonate and 1.28 g. (8.6 mmole) of 4-morpholinocarbonyl chloride. The mixture is refluxed for four hours, filtered and con-

3 centrated in vacuo. The residue is recystallized from benzene:cyclohexane:ethyl acetate to yield N-morpholinocarbonyl-1-ethyl-8-methoxy-2,3,4,5-tetrahydro - 1,4-methano-1H-3-benzazepine.

In a similar fashion from piperidinocarbonyl chloride and pyrrolidinocarbonyl chloride there are respectively obtained N-piperidinocarbonyl-1-ethyl-8-methoxy-2,3,4,5-tetrahydro-1,4-methano-1H-3-benzazepine and N-pyrrolidinocarbonyl-1-ethyl-8-methoxy - 2,3,4,5 - tetrahydro-1,4-methano-1H-3-benzazepine.

EXAMPLE 3

To a solution of 1.54 mmole of 1-ethyl-2,3,4,5-tetrahydro-1,4-methano-1H-3-benzazepine in 25 ml. glacial acetic acid is added 1.24 g. of potassium isocyanate. The resulting solution is heated 10 minutes on a steam bath, then diluted with 100 ml. of water and rendered basic with 50% sodium hydroxide solution. The mixture is extracted with chloroform and the chloroform phase washed with water and dried. Evaporation of the dried chloroform extracts on trituration with benzene yields N-carbamyl-1-ethyl-2,3,4,5-tetrahydro-1,4-methano-1H-3-benzazepine.

EXAMPLE 4

To a mixture of 0.72 mmole of 1-phenyl-2,3,4,5-tetrahydro-1,4-methano-1H-3-benzazepine, 1.85 g. of sodium bicarbonate and 50 ml. of anhydrous benzene are added 17 ml. of 12.5% phosgene in benzene. After refluxing for 1½ hours the solution is cooled, filtered and concentrated in vacuo. The residue is treated with 8 ml. of 4.3% of alcoholic ammonia solution at 95° C. for 16 hours in a pressure bottle. After evaporation, the resulting residue is taken up in chloroform and washed with water. The dried chloroform solution upon evaporation yields N-carbamyl-1-phenyl-2,3,4,5-tetrahydro-1,4-methano - 1H-3-benzazepine which is recrystallized from benzene.

EXAMPLE 5

A solution of 0.38 mmole of 1-phenyl-2,3,4,5-tetrahydro-1,4-methano-1H-3-benzazepine and 0.3 g. methyl isothiocyanate in 70 ml. of anhydrous tetrahydrofuran is refluxed for 18 hours under anhydrous conditions. The solution is concentrated and cooled. Recrystallization of the solid from 1:2 ethyl acetate:cyclohexane yields N-methylthiocarbamyl-1-phenyl - 2,3,4,5 - tetrahydro-1,4-methano-1H-3-benzazepine, which is recrystallized from methanol.

EXAMPLE 6

A solution of 1.68 mmole of 1-ethyl-8-methoxy-2,3,4,5-tetrahydro-1,4-methano-1H-3-benzazepine, 0.25 g. (2.75 mmole) of ethyl isothiocyanate and 60 ml. of anhydrous tetrahydrofuran is refluxed for 3¼ hours. The solution is concentrated in vacuo and the residue recrystallized from methanol to yield N-ethylthiocarbamyl-1-ethyl-8-methoxy-2,3,4,5-tetrahydro-1,4-methano-1H-3-benzazepine.

EXAMPLE 7

To a mixture of .031 mole of N-cyano-1-ethyl-8-acetoxy - 2,3,4,5 - tetrahydro-1,4-methano-1H-3-benzazepine, 9.7 ml. of 30% hydrogen peroxide and 30 ml. of ethanol are added slowly 5.6 ml. of 6 N aqueous sodium hydroxide solution with stirring and external cooling, maintaining the temperature at 35–40°. When addition is complete, the cooling bath is removed and the mixture is stirred at 50–60° for three and one-half hours. The mixture is then cooled and the solid is collected by filtration and washed with water and ethanol to yield N-carbamyl-1-ethyl-8-hydroxy - 2,3,4,5 - tetrahydro - 1,4-methano-1H-3-benzazepine.

The requisite N-cyano compound may be obtained as follows:

A mixture of 0.6 mmole of N-methyl-1-ethyl-8-hydroxy-2,3,4,5-tetrahydro-1,4-methano-3-benzazepine and 8.4 ml. of acetic anhydride is heated at 100° C. for 45 minutes. The solution is then poured into 20 ml. of cold water and after five minutes, an aqueous solution of 50% potassium hydroxide is added in slight excess with cooling. The liberated base is shaken quickly into ether. Drying and evaporation of the ethereal solution, followed by recrystallization from isopropyl ether of the solid thus obtained affords N-methyl-1-ethyl-8-acetoxy-2,3,4,5-tetrahydro-1,4-methano-3-benzazepine.

To a solution of 2.6 g. of cyanogen bromide in 30 ml. of chloroform is added at room temperature a solution of 2.01 mmole of N-methyl-1-ethyl-8-acetoxy-2,3,4,5-tetrahydro-1,4-methano-3-benzazepine in 30 ml. of chloroform over a period of 45 minutes. The solution is refluxed for three hours and then evaporated to dryness in vacuo. The residue is crystallized from ethanol to yield N-cyano - 1 - ethyl - 8 - acetoxy - 2,3,4,5 - tetrahydro-1,4-methano-1H-3-benzazepine.

EXAMPLE 8

One and a half grams of N-carbamyl-1-ethyl-8-hydroxy-2,3,4,5-tetrahydro-1,4-methano-1H-3-benzazepine, 10 ml. of dry pyridine and 1.17 g. of propionic anhydride are briefly heated to bring about solution. The solution is stirred at room temperature overnight and then treated with sufficient 2 N hydrochloric acid to render the solution acidic to Congo red. The mixture is then extracted with chloroform and the extracts dried and concentrated to yield N-carbamyl-1-ethyl-8-propionoxy-2,3,4,5-tetrahydro-1,4-methano-1H-3-benzazepine which is recrystallized from ethanol.

In a similar fashion by employing acetic anhydride in place of propionic anhydride, there is obtained N-carbamyl-1-ethyl-8-acetoxy-2,3,4,5-tetrahydro-1,4 - methano-1H-3-benzazepine.

EXAMPLE 9

A solution of 9.03 mmole of N-cyano-1-ethyl-8-acetoxy-2,3,4,5 - hexahydro - 2,4-methano-1H-3-benzazepine, 12.8 ml. triethylamine and 75 ml. pyridine is cooled to —70°. Hydrogen sulfide is introduced over a period of 10 minutes and the solution then allowed to return to room temperature and stand overnight. The solution is then concentrated and the residue heated at reflux with 50 ml. ethanol and 10 ml. of 1 N sodium hydroxide for 2 hours. The pH is adjusted to 6–7 and the N-thiocarbamyl-1-ethyl-8-hydroxy-2,3,4,5-hexahydro-2,3-methano-1H - 3-benzazepine thus formed is collected, dried and recrystallized from 2:1:1 water:acetone:dimethylsulfoxide.

EXAMPLE 10

To a solution of 1.0 g. of N-carbamyl-1-ethyl-8-acetoxy-2,3,4,5-hexahydro-2,6-methano-1H - 3 - benzazepine in 50 ml. pyridine is added 1.0 g. phosphorus pentasulfide. The solution is refluxed for 3 hours and then concentrated in vacuo. The residue is hydrolyzed in 20 ml. of 2 N sodium hydroxide. The solution is then neutralized with dilute hydrochloric acid to yield N-thiocarbamyl-1-ethyl-8-hydroxy-2,3,4,5-hexahydro-2,6-methano-1H-3-benzazepine.

What is claimed is:
1. A compound of the formula:

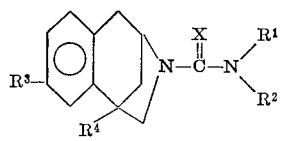

wherein:

X is oxygen or sulfur;
each of $R^1$ and $R^2$ taken independently is hydrogen or (lower)alkyl and $R^1$ and $R^2$ taken together with the nitrogen to which they are attached are morpholino, piperidino or pyrrolidino;
$R^3$ is hydrogen, hydroxy, (lower)alkoxy or (lower)alkanoyloxy; and
$R^4$ is phenyl or (lower)alkyl.

2. A compound according to claim 1 wherein $R^3$ is hydrogen, hydroxy, methoxy or acetoxy and $R^4$ is phenyl or ethyl.

3. The compound according to claim 1 wherein X is oxygen, each of $R^1$, $R^2$ and $R^3$ is hydrogen and $R^4$ is phenyl.

4. The compound according to claim 1 wherein X is oxygen, each of $R^1$, $R^2$ and $R^3$ is hydrogen and $R^4$ is ethyl.

5. The compound according to claim 1 wherein X is oxygen, each of $R^1$ and $R^2$ is hydrogen, $R^3$ is hydroxy and $R^4$ is ethyl.

6. The compound according to claim 1 wherein X is oxygen, each of $R^1$ and $R^2$ is hydrogen, $R^3$ is methoxy and $R^4$ is ethyl.

7. The compound according to claim 1 wherein X is sulfur, each of $R^1$ and $R^2$ is hydrogen, $R^3$ is hydroxy and $R^4$ is ethyl.

8. The compound according to claim 1 wherein X is oxygen, each of $R^1$ and $R^2$ is methyl, $R^3$ is hydrogen and $R^4$ is phenyl.

9. The compound according to claim 1 wherein X is oxygen, $R^1$ and $R^2$ taken together with the nitrogen to which they are attached are morpholino, $R^3$ is methoxy and $R^4$ is ethyl.

References Cited

UNITED STATES PATENTS 3,341,538   9/1967   Block et al. _____ 260—247.2

ALEX MAZEL, Primary Examiner

A. M. T. TIGHE, Assistant Examiner

U.S. Cl. X.R.

260—247.1, 293.4, 294, 294.3, 326.3, 326.5, 326.8, 326.81, 326.83; 424—232, 248, 253, 267, 274